Patented May 11, 1943

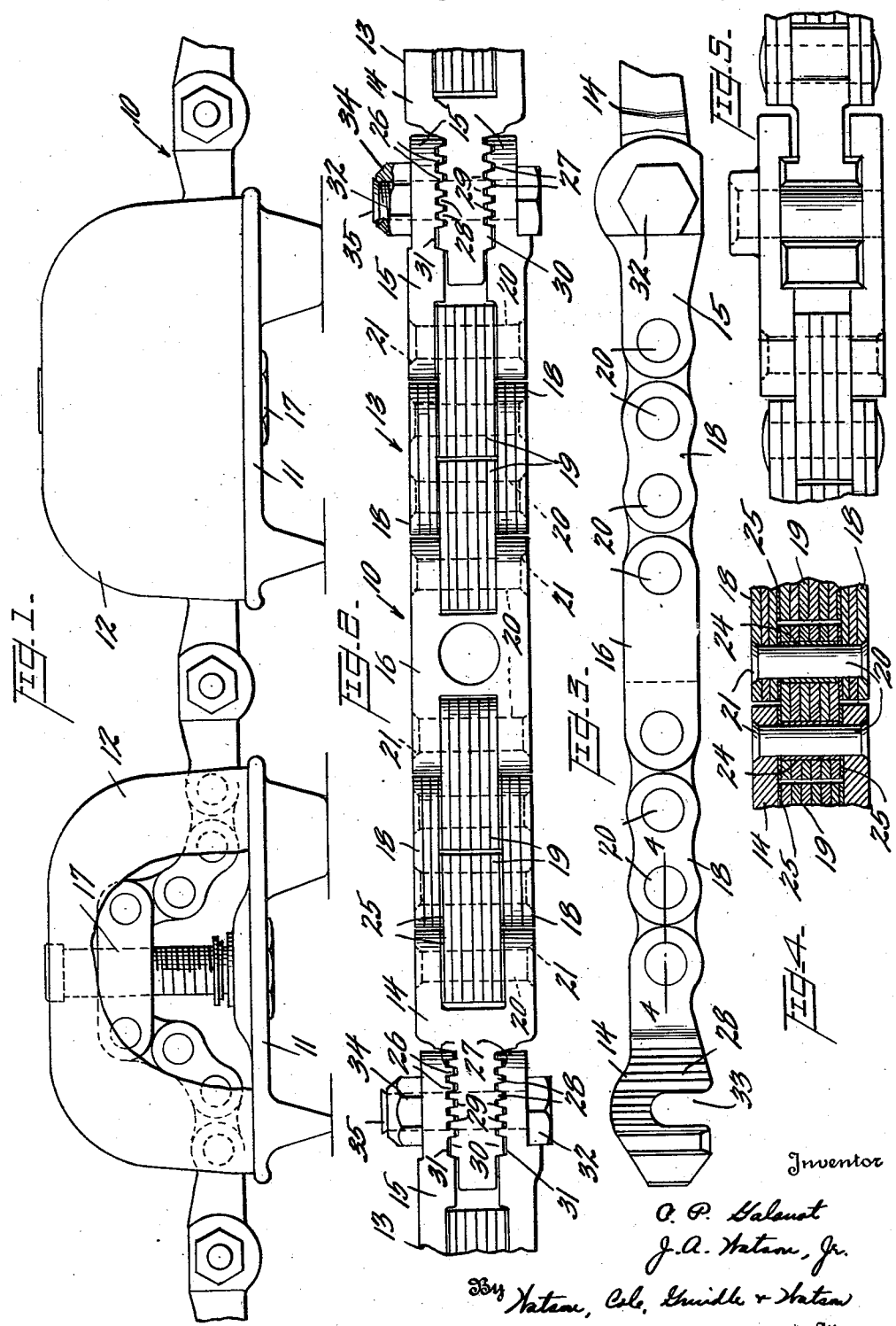

2,318,683

UNITED STATES PATENT OFFICE 2,318,683

TRACTION DEVICE

Camille P. Galanot, Alliance, Ohio, and James A. Watson, Jr., Silver Spring, Md., assignors to themselves and Charles L. Galanot, Alliance, Ohio, and Harold F. Watson, Silver Spring, Md., as trustees Application August 20, 1941, Serial No. 407,634

5 Claims. (Cl. 305—10)

This invention relates to traction devices of the general type described in our copending application Serial No. 335,124, filed May 14, 1940, and more particularly to the belt or connecting means between the traction shoes of such devices. It is the general object of the present invention to provide a novel and advantageous type of belt particularly adapted for use in connection with traction devices, and comprising a plurality of sections having novel means associated therewith for effecting connection between adjacent belt sections.

Another object of the invention is the provision of a belt adapted for the purposes set forth comprising a plurality of sections of the link belt type, with novel means for connecting adjacent sections, the individual links being pin-connected in a novel and advantageous manner whereby the parts having relative movement during flexion of the belt are sealed against the intrusion of dirt, moisture, and the like, thus promoting efficient operation and an extended useful life.

A further object is the provision of connecting means for the respective sections of a sectional belt of the type in question, comprising complementary elements at the respective ends of each section for engagement with the mating elements of the adjacent sections, such elements being provided with lateral projections and mating recesses for interlocking engagement to transmit tension forces, together with transversely extending securing means for maintaining the connecting elements in interlocking relation, said securing means being associated with the connecting elements in such a manner that no tension forces are transmitted through the securing means.

Another object is the provision of connecting elements of complementary form, each said element being provided with a plurality of lateral projections and corresponding recesses, one lateral projection and the corresponding recess of each mating pair of elements being formed differently from the other projections and recesses, whereby the respective elements of a mating pair may only be assembled in one predetermined relation, thus facilitating assembly under conditions of poor visibility.

A further object is the provision of a belt of the type described, which may be readily disassembled, for example in the field, without detaching any parts of elements from the respective sections thereof, whereby the loss or misplacement of small elements such as nuts, bolts, and the like is avoided.

Other and further objects, features and advantages of the present invention will be apparent to one skilled in the art from the following description taken in connection with the accompanying drawing in which:

Figure 1 is a side elevation of a portion of a traction device comprising a connecting belt constructed according to the present invention;

Figure 2 is a plan view of a portion of a connecting belt according to the invention;

Figure 3 is a side elevation of the belt of Figure 2;

Figure 4 is a fragmentary horizontal section on line 4—4 of Figure 3; and

Figure 5 is a fragmentary plan view of an alternative form of connecting element.

In order to facilitate an understanding of the invention, reference is made to the embodiment thereof shown in the accompanying drawing and detailed descriptive language is employed. It will nevertheless be understood that no limitation of the invention is thereby intended and that various changes and alterations are contemplated such as would ordinarily occur to one skilled in the art to which the invention relates.

As more fully described in our copending application Serial No. 335,124, a traction device of the general type with which the present invention is concerned comprises a connecting belt and a series of traction shoes secured thereon at spaced intervals. The connecting belt may be made in a single length, or in a plurality of sections, the latter being preferred for the reason that it facilitates the assembly of such traction devices in the field, and permits their ready adaptation to various types of vehicles, all as more fully explained in our said copending application. Each belt section may be provided with one or more traction shoes, the greatest flexibility of assembly being provided, of course, when each belt section carries but one traction shoe. For present purposes the latter type of belt is illustrated and described, but it will be understood that the objects and advantages of the present invention may also be secured by employing the invention in connection with belt sections carrying two or more traction shoes.

Referring now to Figure 1, the traction device portion there illustrated comprises generally a connecting belt 10 and a series of spaced traction shoes 11 secured to the belt 10. Each traction shoe 11 carries a guide block 12 for guiding the same relative to the wheels of the vehicle with which it is associated, said guide block also preferably enclosing adjusting means for varying the total length of the traction device, as described and claimed in our said copending application.

Referring to Figures 2 and 3 the connecting belt 10 comprises a plurality of similar sections 13 of the link belt type, the end links 14 and 15, respectively, of each section serving as connecting elements for interconnecting the respective belt sections. In the illustrated embodiment, the central link 16 comprises an adjusting block for cooperation with the bolt 17 (Figure 1) in the manner described in our said copending application.

The links intervening between the connecting elements 14 and 15 respectively, and the adjusting block 16, comprise the outer links 18 and inner links 19, both of which are preferably of laminated structure. The respective ends of the links 16, 18 and 19, and the inner ends of links or connecting elements 14 and 15 are suitably apertured to receive the connecting pins 20, which latter make a tight pressed fit with the outer links 18 and, after assembly, are upset into the countersunk outer leaves of the links 18 as at 21 in order to permanently secure the respective links in assembled relationship.

A metal bushing 24 (Figure 4) surrounds the central portion of each pin 20 and is rotatable relative thereto, each bushing 24 making a tight pressed fit with the associated inner link 19. It will thus be understood that the only relative movement which takes place during flexion of the belt is a relative rotation between the pins 20 and the bushings 24.

In order to seal the bearings thus constituted against the intrusion of dirt, moisture, and other foreign matters, a compressible, resilient sealing washer 25, which may for example be formed of neoprene or similar material, is interposed between the adjacent surfaces of the inner and outer links engaging each pin, and closely encircles the pin thus sealing the respective ends of the bushings 24. The washers 25 are preferably compressed during assembly of the belt to such an extent as will ensure an adequate sealing action. The bearing surfaces of the pins 20 and bushings 24 may be suitably lubricated during assembly of the belt and will not require further lubrication, since the washers 25 will prevent loss of the lubricant as well as entrance of foreign matter.

The connecting elements 14 and 15 at the respective ends of each belt section are of complementary form, so that each connecting element is adapted to closely engage, in interlocking engagement, the mating connecting element of the adjacent belt section. The element 15 is preferably bifurcated, as shown, the inner surfaces of the respective arms 15' being provided with transversely extending projections or teeth 26, providing intervening recesses 27. The lateral surfaces of the elements 14 are similarly provided with transversely extending teeth 28 and corresponding recesses 29 for engagement with the recesses 27 and teeth 26, respectively, of the elements 15.

In order that the mating elements 14 and 15 of two adjacent sections may be properly assembled in darkness or under other conditions of poor visibility, at least one tooth 30 of each element 14 and the corresponding recess 31 of each element 15 are formed differently from the remaining teeth and recesses. In the illustrated embodiment, the tooth 30 and recess 31 are made broader than the remaining teeth and recesses, but other variations in form might be employed. However, it is preferable to employ only such a variation in form that the assembly of the respective elements by a relative transverse movement is not interfered with.

The respective arms 15' of the connecting elements 15 are apertured to receive a bolt 32, and each connecting element 14 is slotted as at 33 to provide clearance for the bolt 32. The slot 33 is made somewhat wider than the diameter of the bolt 32, so that no part of the connecting element 14 will engage the bolt. It will thus be appreciated that the tension forces to which the belt is subjected will be transmitted in their entirety through the teeth 26 and 28, there being no forces stressing the bolt 32 in shear. Also, by virtue of this arrangement there is no tendency for the bolts 32 to rotate in service, inadvertent loosening of the nuts 34 being thus avoided.

The bolts 32 are permanently associated with the connecting elements 15, the end of each bolt being turned over as at 35 after the nut 34 has been threaded thereon in the course of assembly at the factory.

In assembling a plurality of sections into a continuous belt, each mating pair of connecting elements may be joined in the following manner. The nut 34 is retracted, and the connecting element 14 is moved transversely into interlocking engagement between the arms 15' of the connecting element 15 of the adjacent belt section, the connecting element 14 thus embracing but not engaging the bolt 32. The nut 34 is then tightened sufficiently to press the arms 15' into firm engagement with the element 14 and the operation is complete. As explained above, there is no tendency for the nut 34 to work loose, as there is no relative movement between the bolt 32 and the element 15.

In disassembling the belt, the nut 34 is retracted sufficiently to release the pressure of the arms 15' against the element 14, when the latter may be withdrawn from engagement with the former by simple transverse movement. No elements are detached, the bolt 32 and nut 34 being permanently associated with the connecting element 15, and their loss or displacement being thus avoided.

Preferably the teeth 26, 28 and 30 are tapered as shown and are made slightly broader (i. e., in a direction longitudinally of the belt) than the corresponding recesses, so that any wearing of the walls of the teeth and recesses may be compensated by simply tightening the nut 34, without in any way affecting the length of the belt.

From the foregoing description it will be apparent that the present invention provides a belt for traction devices accomplishing the objects and possessing the advantages hereinbefore enumerated.

The advantages set forth may also be realized in large part by utilizing the form of connecting elements shown in Figure 5 in which the bifurcated element is not toothed, but is provided with a single large recess defined by its respective arms and by inwardly directed projections at the distal ends thereof, while the mating element is formed as a rectangular block fitting in said recess. This construction is economical, rugged, and extremely simple and positive in operation.

Having thus described the invention, what is claimed as new and desired to be secured by Letters Patent is:

1. Connecting means for the sections of sectional belts, comprising complementary connecting elements at the respective ends of each section, each said element having lateral projections for tension-transmitting engagement with mating recesses of the complementary connecting element of the adjacent section, and means for securing the connecting elements of adjacent sections in interlocking relation, one of said lateral projections and the corresponding recess of a mating pair of elements being given a complementary form differing from that of the remaining projections and recesses, whereby said mating pair may only be assembled in one predetermined relation.

2. Connecting means for the sections of sectional belts, comprising complementary connecting elements at the respective ends of each section, each said element having a longitudinal surface provided with transverse teeth and alternating grooves, one tooth and the corresponding groove of a mating pair being of different dimensions than the remaining teeth and grooves, whereby said mating pair may only be assembled in one predetermined relation.

3. Connecting means for the sections of sectional belts, comprising complementary connecting elements at the respective ends of each section, each said element having lateral projections for tension-transmitting engagement with mating recesses of the complementary connecting element of the adjacent section, and means for securing the connecting elements of adjacent sections in interlocking relation, said last means comprising a member extending transversely of said connecting elements and adapted to clamp them together, said connecting elements being formed with aligned apertures to receive said securing member, the aperture of one of said elements being larger than the cross-section of said securing member, whereby the latter is incapable of transmitting tension stresses between said elements.

4. Connecting means for the sections of sectional belts, comprising complementary connecting elements at the respective ends of each section, each said element having lateral projections for tension-transmitting engagement with mating recesses of the complementary connecting element of the adjacent section, and means for securing the connecting elements of adjacent sections in interlocking relation, said last means comprising a member extending transversely through said connecting elements, one of said elements being bifurcated and having its said projections longitudinally spaced and extending inwardly from its respective arms, said other element having its said projections spaced to be engaged between said spaced projections of said first element by a relative movement transverse to the length of said belt sections.

5. Connecting means for the sections of sectional belts, comprising complementary connecting elements at the respective ends of each section, each said element having lateral projections for tension-transmitting engagement with mating recesses of the complementary connecting element of the adjacent section, and means for securing the connecting elements of adjacent sections in interlocking relation, said last means comprising a member extending transversely through said connecting elements, one of said elements being bifurcated and having its said projections longitudinally spaced and extending inwardly from its respective arms, said other element having its said projections spaced to be engaged between said spaced projections of said first element by a relative movement transverse to the length of said belt sections, said securing means being permanently associated with said bifurcated element and said other element having a transverse slot providing clearance for said securing means when said elements are moved into interlocking relation.

CAMILLE P. GALANOT.
JAMES A. WATSON, JR.